US011323474B1

(12) United States Patent
Agrawal et al.

(10) Patent No.: US 11,323,474 B1
(45) Date of Patent: *May 3, 2022

(54) SYSTEM AND METHOD FOR DETERMINING ENDPOINT COMPATIBILITY WITH SUBNET PREFIX OF ALL-ONES FOR LATERAL PROPAGATION PREVENTION OF RANSOMWARE

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,615

(22) Filed: Jul. 28, 2021

(51) Int. Cl.
*H04L 29/06* (2006.01)
*H04L 12/46* (2006.01)

(52) U.S. Cl.
CPC ........ *H04L 63/145* (2013.01); *H04L 12/4641* (2013.01); *H04L 63/0209* (2013.01); *H04L 63/10* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,914,905 B1 | 7/2005 | Yip et al. | |
| 8,055,800 B1 | 11/2011 | Bardzil et al. | |
| 9,306,965 B1* | 4/2016 | Grossman | H04L 63/1425 |
| 9,602,529 B2 | 3/2017 | Jones et al. | |
| 10,454,950 B1* | 10/2019 | Aziz | H04L 63/1441 |
| 11,030,311 B1* | 6/2021 | Lopez | G06F 21/552 |
| 11,093,139 B1 | 8/2021 | Karr et al. | |
| 2016/0323318 A1* | 11/2016 | Terrill | H04L 63/0227 |
| 2017/0149775 A1 | 5/2017 | Bachar et al. | |
| 2019/0312836 A1* | 10/2019 | Phillips | H04L 63/0236 |
| 2020/0145416 A1* | 5/2020 | Mitzimberg | G06F 21/552 |
| 2020/0356664 A1* | 11/2020 | Maor | H04L 63/10 |
| 2021/0152595 A1 | 5/2021 | Hansen et al. | |

OTHER PUBLICATIONS

Thapa, Manish, "Mitigating Threats in IoT Network Using Device Isolation", Master's Thesis, Feb. 4, 2018, 73 pgs.
International Search Report and Written Opinion for PCT/US2020/020593, dated Apr. 15, 2020, 8 pgs.
International Preliminary Report on Patentability for PCT/US2020/020593, Completed May 18, 2021, 8 pgs.

* cited by examiner

*Primary Examiner* — Christopher C Harris
(74) *Attorney, Agent, or Firm* — Patent Law Works LLP

(57) ABSTRACT

A technique to stop lateral movement of ransomware between endpoints in a VLAN is disclosed. A security appliance is set as the default gateway for intra-LAN communication. Message traffic from compromised endpoints is detected. Attributes of ransomware may be detected in the message traffic, as well as attempts to circumvent the security appliance. Compromised devices may be quarantined.

21 Claims, 13 Drawing Sheets

SYSTEM AND METHOD FOR DETERMINING ENDPOINT COMPATIBILITY WITH SUBNET PREFIX OF ALL-ONES FOR LATERAL PROPAGATION PREVENTION OF RANSOMWARE

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A technique to detect lateral propagation of ransomware between endpoints in a VLAN is disclosed. In one implementation, a smart appliance is deployed in an access port or a trunk port of VLAN network. The smart appliance is set as the default gateway for intra-LAN communication for two or more endpoint devices. Message traffic from compromised endpoints is detected.

Additional measures may also be taken to generate alerts or quarantine compromised end point devices.

An example of a computer-implemented method of ransomware protection in a Virtual Local Area Network (VLAN) includes deploying a security appliance in an access or a trunk port of a shared VLAN environment. A subnet mask of 255.255.255.255 is used to set the security appliance as a default gateway for a plurality of endpoint devices of the shared VLAN environment. The security appliance monitors intra-VLAN communication between the plurality of endpoint devices of the shared VLAN environment. The security appliance detects lateral propagation of ransomware between endpoint devices via intra-VLAN communication in the shared VLAN environment.

An example computer-implemented method of ransomware protection in a Virtual Local Area Network (VLAN) includes performing a compatibility test to classify a plurality of endpoint devices in a VLAN environment based on their compatibility with a subnet mask of 255.255.255.255, deploying the security appliance in an access or a trunk port of the shared VLAN environment, using a subnet mask of 255.255.255.255 to set the security appliance as a default gateway for the endpoint devices of the shared VLAN environment compatible with a subnet mask of 255.255.255.255; and using an original subnet mask, different than 255.255.255.255, for endpoint devices of the shared VLAN environment incompatible with a subnet mask of 255.255.255.255. In one implementation, the method further includes monitoring, by the security appliance, intra-VLAN communication between the plurality of endpoint devices of the shared VLAN environment; and detecting, by the security appliance, lateral propagation of ransomware between endpoint devices via intra-VLAN communication in the shared VLAN environment.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
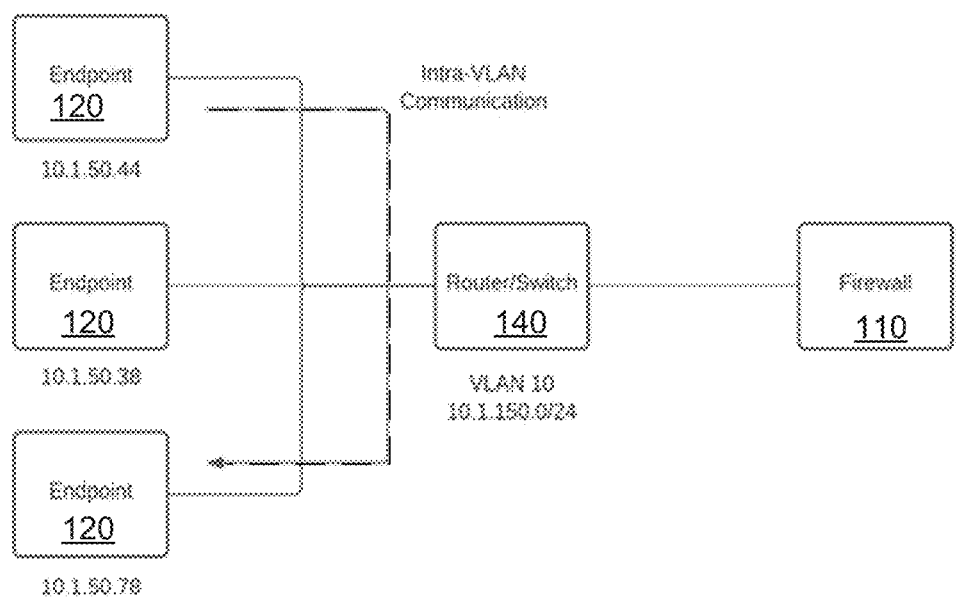
FIG. 1 is a block diagram illustrating Intra-LAN traffic in a conventional VLAN network.
Figure 2:
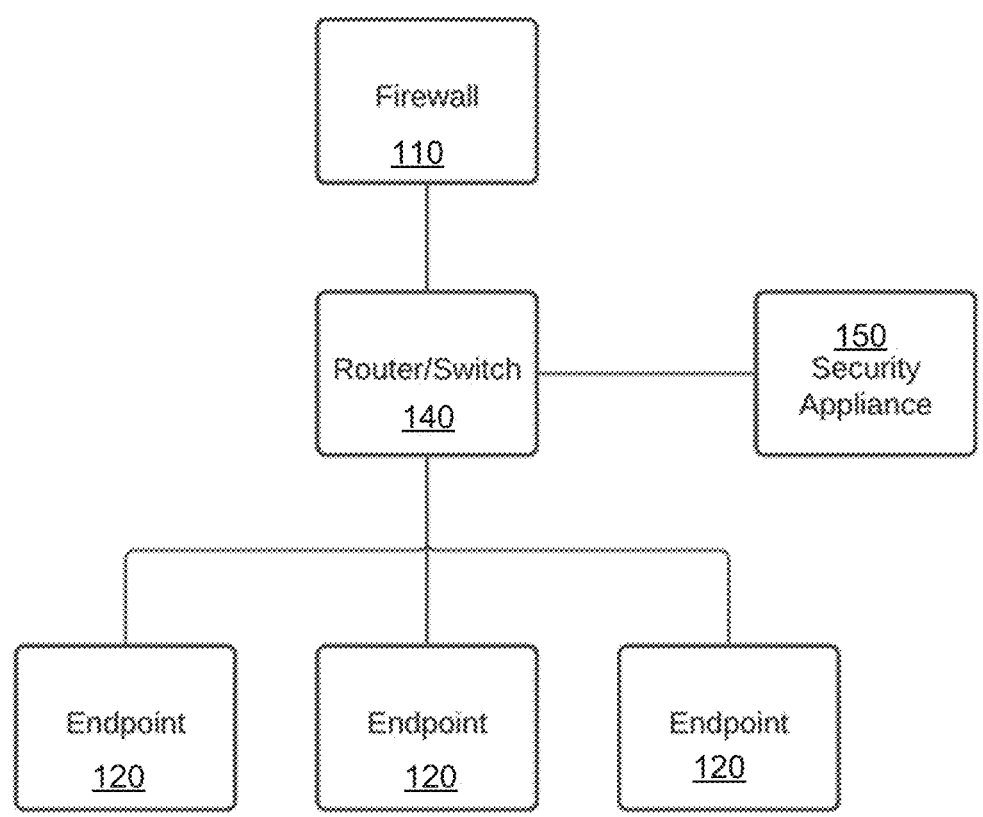
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security application 150 may be implemented as software compatible with a virtual machine (VM) implementation, such as within a hypervisor implementation in VMware®. The security appliance may be deployed on a port that allows the security application to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all-ones—255.255.255.255—that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
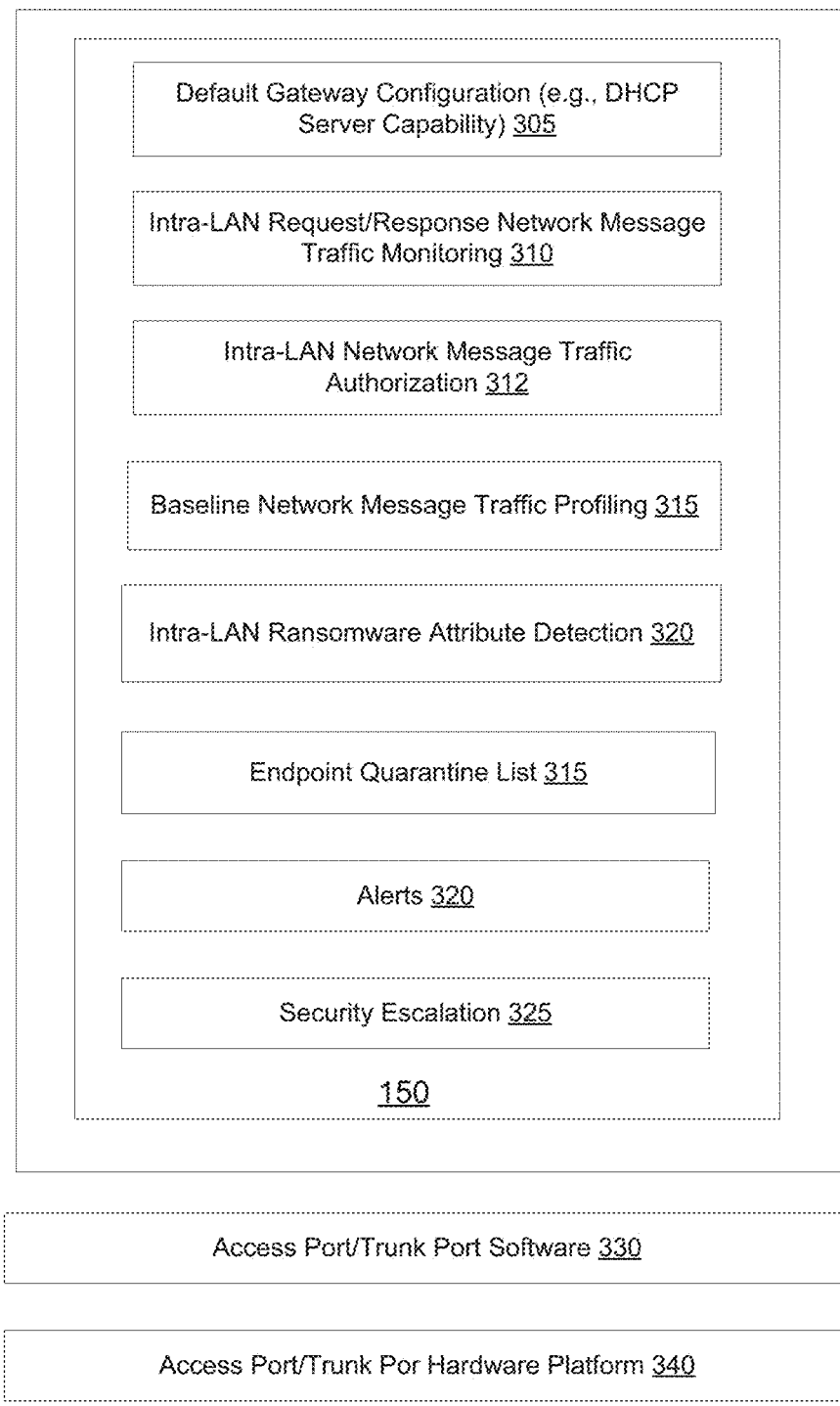
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 315 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
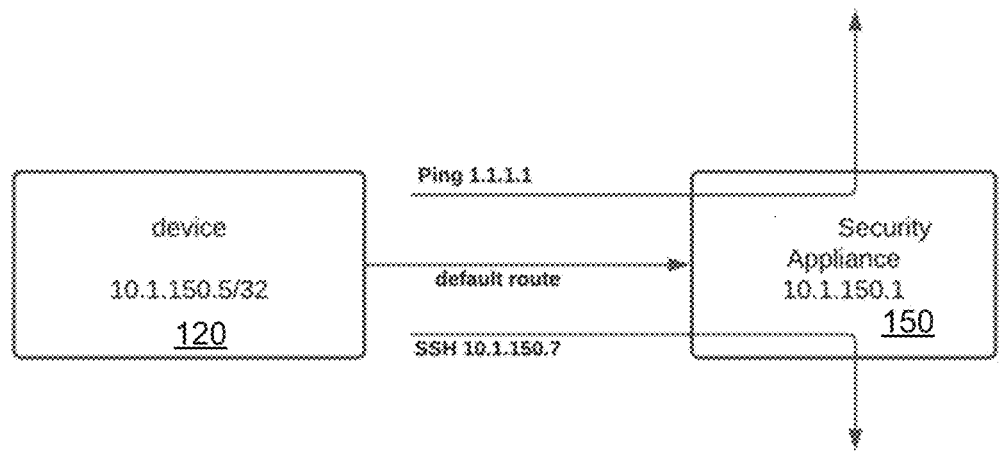
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
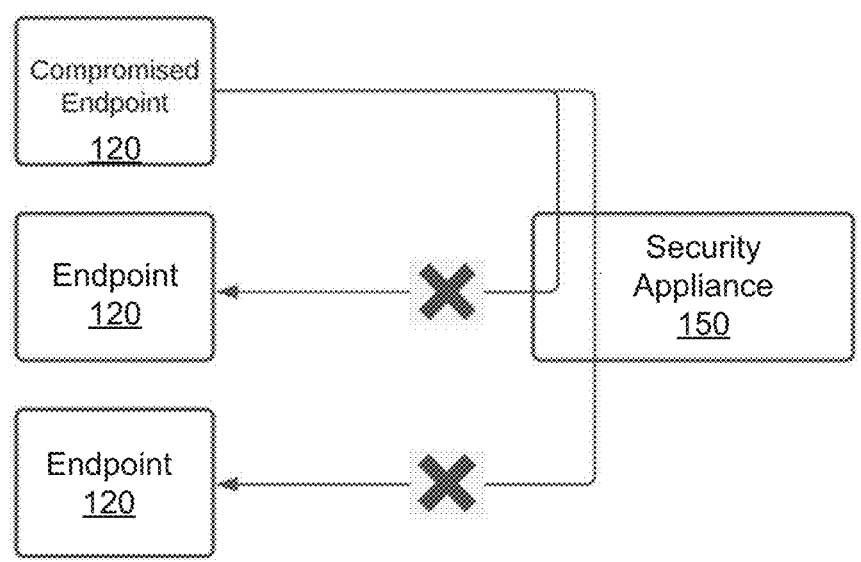
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
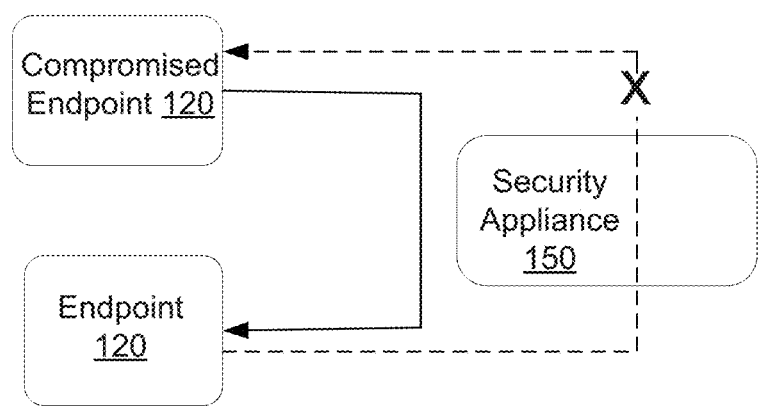
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
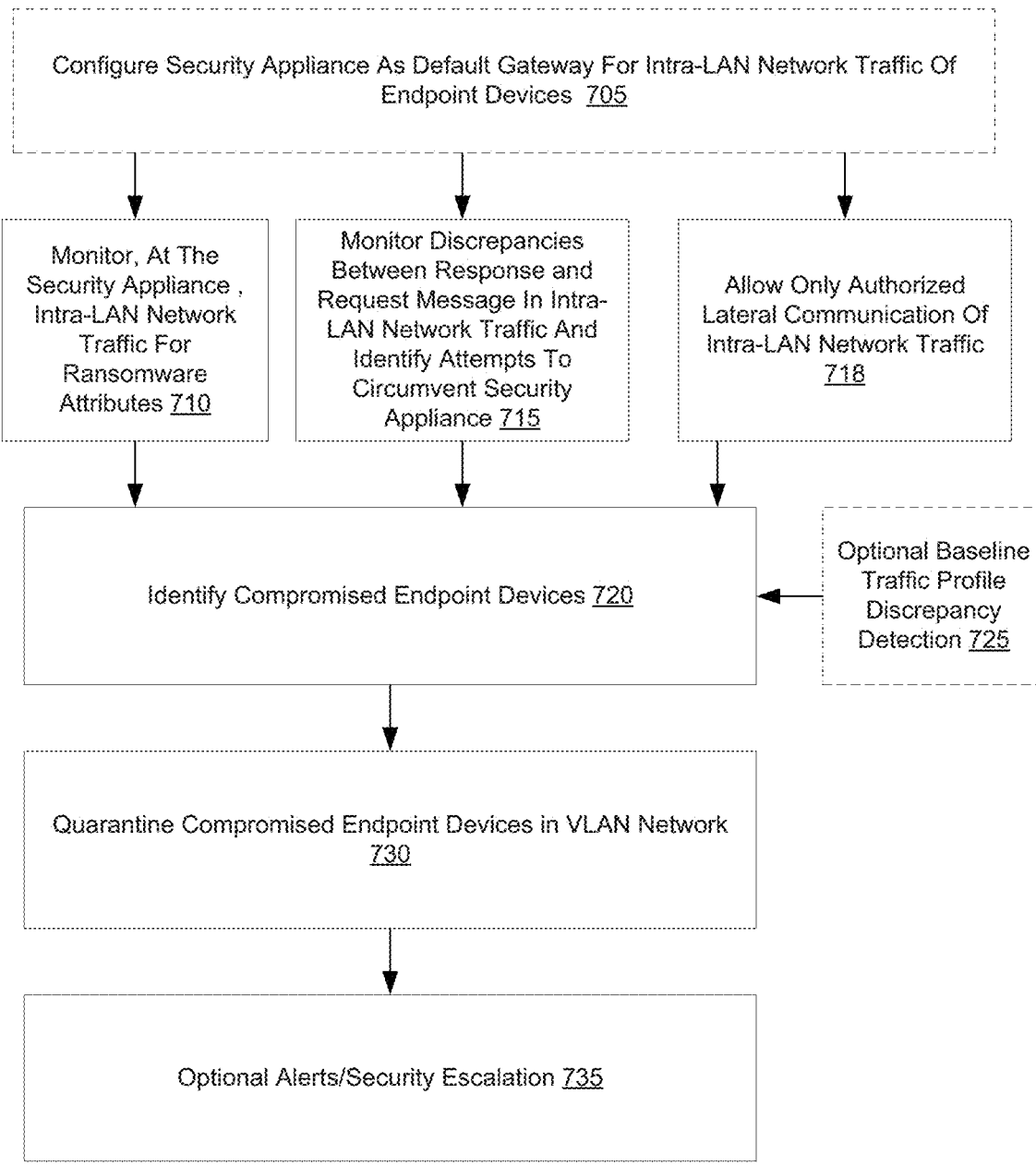
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Determining Endpoint Compatibility

As previously discussed, a security appliance may be used to protect device endpoints on a shared VLAN network typically found in enterprise deployments. The security appliance acts as DHCP server handing out a subnet prefix of all-ones (255.255.255.255) to each device endpoint. Since the endpoint's subnet prefix is all-ones (255.255.255.255), all outbound traffic from that device endpoint (both intra-VLAN and inter-VLAN/internet traffic) are routed to the security appliance. The security appliance acts as default gateway on this shared VLAN. The security appliance permits only authorized message flows between device endpoints in the same shared network, thereby reducing the attack surface available for lateral propagation of ransomware.

One issue associated with using the security appliance in different enterprise environments lies in the face that individual companies may, in some cases, have individual endpoint devices that do not support a subnet prefix of all-ones. As an example, an individual enterprise may have some IoT devices that are either running outdated versions of operating system stacks or custom operating systems. As examples, some types of printers, security cameras, and switches may not support a subnet prefix of all-ones. This issue may also depend on the type of enterprise. For example, some industrial environments may have a large number of IoT devices that do not support a subnet prefix of all-ones. As another example, some companies may have legacy devices, such as old printers.

This creates a potential compatibility issue when the security appliance is utilized. In many enterprise environments, all of the IoT devices will support a subnet prefix of all-ones. But in some individual enterprises, there may be a certain percentage of IoT devices that do not support a subnet prefix of all-ones. That could, for example, result in individual incompatible endpoint devices that would stop working properly if the security appliance was implemented in a naïve way. For example, suppose the endpoint device was a printer incompatible with a subnet of ones. In this case, a naïve implementation of the security appliance might result in the printer not working.

There are potential manual workarounds to such issues. Consider, for example, an enterprise having a small percentage of legacy devices that do not support an all-ones subnet. A potential workaround might include manually marking legacy devices and either replacing legacy device (if practical) or making custom modifications to support legacy devices. However, that's undesirable in that customers typically want out-of-the-box solutions that are easy to deploy and don't require time-consuming and confusing manual troubleshooting and/or customization.

In some implementations, software is provided to implement methods to determine endpoint compatibility with a subnet prefix of all-ones for endpoints and devices on a shared VLAN network. This method may include identifying non-compatible endpoint devices. Compatible devices are assigned a subnet prefix of one. Non-compatible endpoint devices may be assigned their original subnet prefix.

The software for performing these methods may, for example, be bundled with software for the security appliance such that compatibility issues are automatically addressed when software for an access port or trunk is upgraded to include the security appliance.

Optional reports and warnings may be generated based on metrics for compatible vs. incompatible endpoint devices. For example, a percentage of incompatible endpoint devices may be identified. Ransomware protection may not necessarily be significantly reduced if the percentage of incompatible endpoint devices is sufficiently low.

The method may be used when creating new networks and on-boarding endpoints to the security application or when migrating existing networks to using the security appliance, when minimal downtime is desired.

Figure 8:
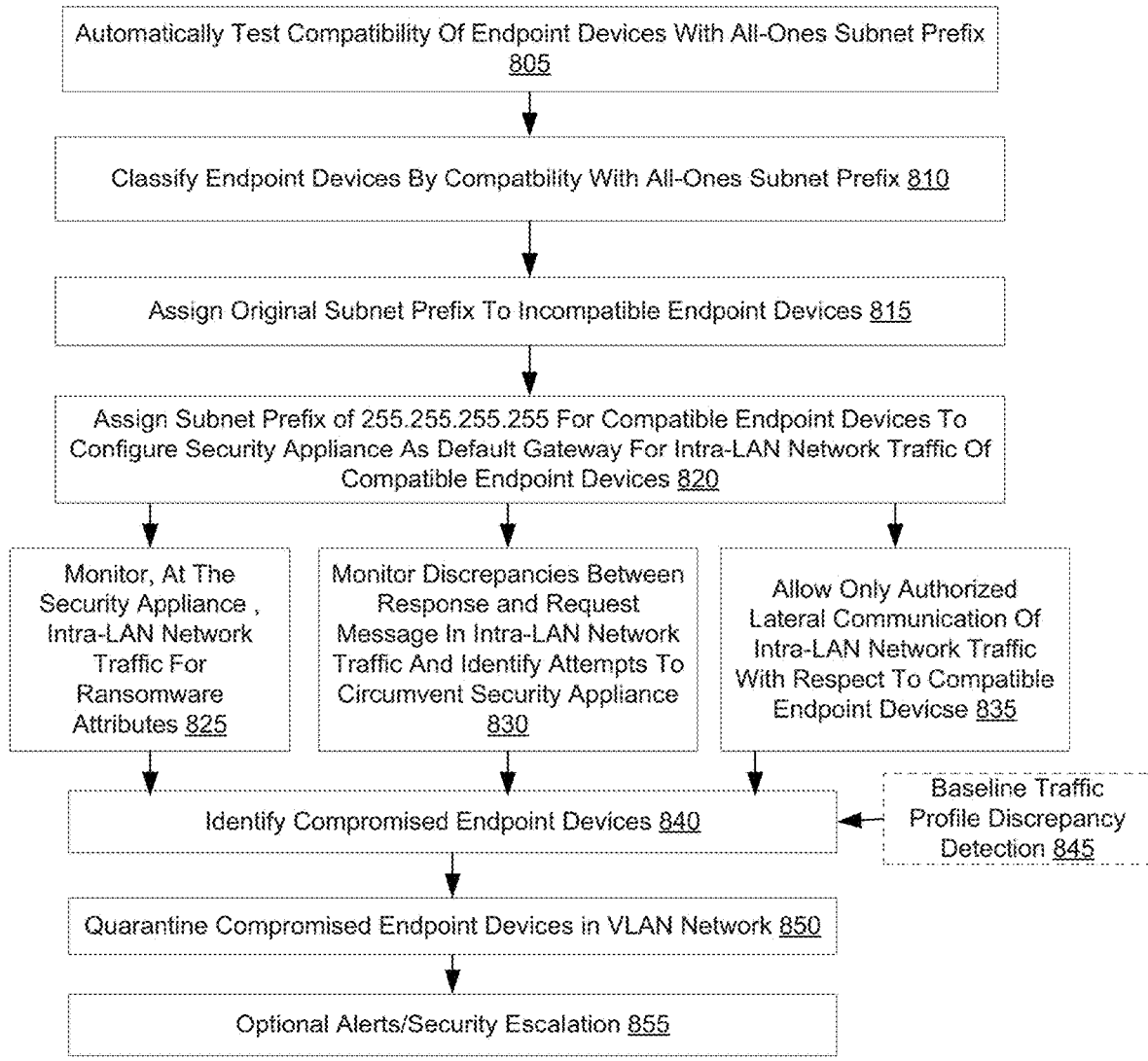
FIG. 8 is a flow chart of determining endpoint device compatibility and assigning subnet prefixes in accordance with an implementation.

FIG. 8 is a flowchart of a high level method in accordance with an implementation. In block 805, the method automatically performs at least one test to identify compatibility of endpoint devices with an all-ones subnet prefix. In one example, the DHCP server function associated with the security appliance identifies endpoint devices reachable using a messages reply with a subnet prefix of all-ones (i.e., 255.255.255.255). In block 810, the method classifies endpoint devices by their compatibility by an all-ones subnet prefix. This may include, for example, generating a list or a map of compatible and incompatible devices.

In one implementation, in block 815 incompatible endpoint devices are assigned their original (e.g., their default) subnet prefix. This results in the security appliance being the default gateway for all compatible endpoint devices. However, communication in the VLAN with incompatible devices is still supported. So, for example, a printer that is not compatible with a subnet prefix of all-ones would still work after the upgrade to implement the security appliance.

In block 820, the method assigns a subnet prefix of all-ones for compatible endpoint devices. This results in the security appliance being configured as the default gateway for Intra-LAN network traffic of compatible devices.

For the purposes of illustration, other steps similar to those illustrated in FIG. 7 may be performed after the security appliance is configured as the default gateway for Intra-LAN network traffic of compatible endpoint devices. This may include monitoring, by the security appliance, ransomware attributes for Intra-LAN traffic in block 825. Discrepancies between response and request message traffic may be monitored in block 830. The security appliance may allow only authorized lateral communication of compatible endpoint devices in block 835. An identification of compromised endpoint devices may be made in block 840, which may optionally take into account baseline traffic profile discrepancies detected in block 845. Compromised endpoint devices may be quarantined in block 850. Additional optional alerts or security escalation may be performed in block 855.

The security and alert measures in FIG. 8 may also take into account the existence of incompatible devices. For example, the security appliance may store a list of the compatible and incompatible endpoint devices. Metrics like baseline traffic analysis may include, for example, traffic between compatible endpoint devices and also traffic between compatible and incompatible endpoint devices.

In many real-world applications there may be only a small percentage of incompatible endpoint devices, e.g., in some cases less than 10%. If the percentage of incompatible devices is within some acceptable limit, there will still be substantial protection against lateral movement of ransomware.

Figure 9:
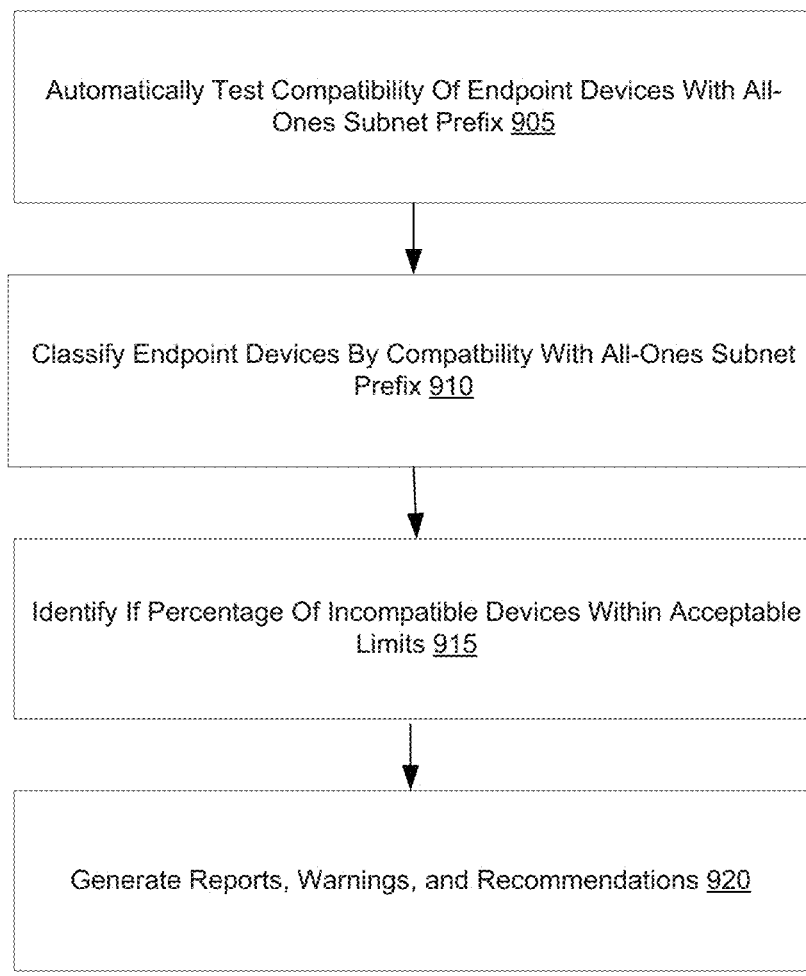
FIG. 9 is a flow chart of method of identifying endpoint compatibility and generating reports in accordance with an implementation.

FIG. 9 is a flowchart of a method illustrating some of these considerations. In block 905, the method automatically performs at least one test to identify the compatibility of endpoint devices with an all-ones subnet prefix. In block 910, endpoint devices are classified by their compatibility with an all-one subnet prefix. This may include generating a list or a map of compatible and incompatible endpoint devices. In block 915, the method identifies if the percentage of incompatible devices is within acceptable limits. This might, for example, be based on one or more threshold levels. If additional information on the type of endpoint device is available, that might also be taken into consideration, as some types of endpoint devices may be more important than others in terms of being weak points or critical points for ransomware attacks.

In block 920, reports, warnings, and recommendations can be generated for users. For example, if the percentage of incompatible devices is beyond some threshold level, a report or warning may be generated. Recommendations may also be generated, such as to implement over time, upgrades to reduce a percentage of incompatible devices. In many enterprise environments, the overwhelming majority of endpoint devices will be compatible with an all-ones subnet prefix (e.g., above 90%). But there may be individual enterprise for which this is not true, that reports, warnings, or recommendations may be useful to understand the degree to which the risk of the lateral propagation of ransomware is reduced. Perfect protection against lateral propagation of ransomware is often not required. In many cases, a substantial reduction in the risk of lateral propagation of ransomware is sufficient.

Figure 10:
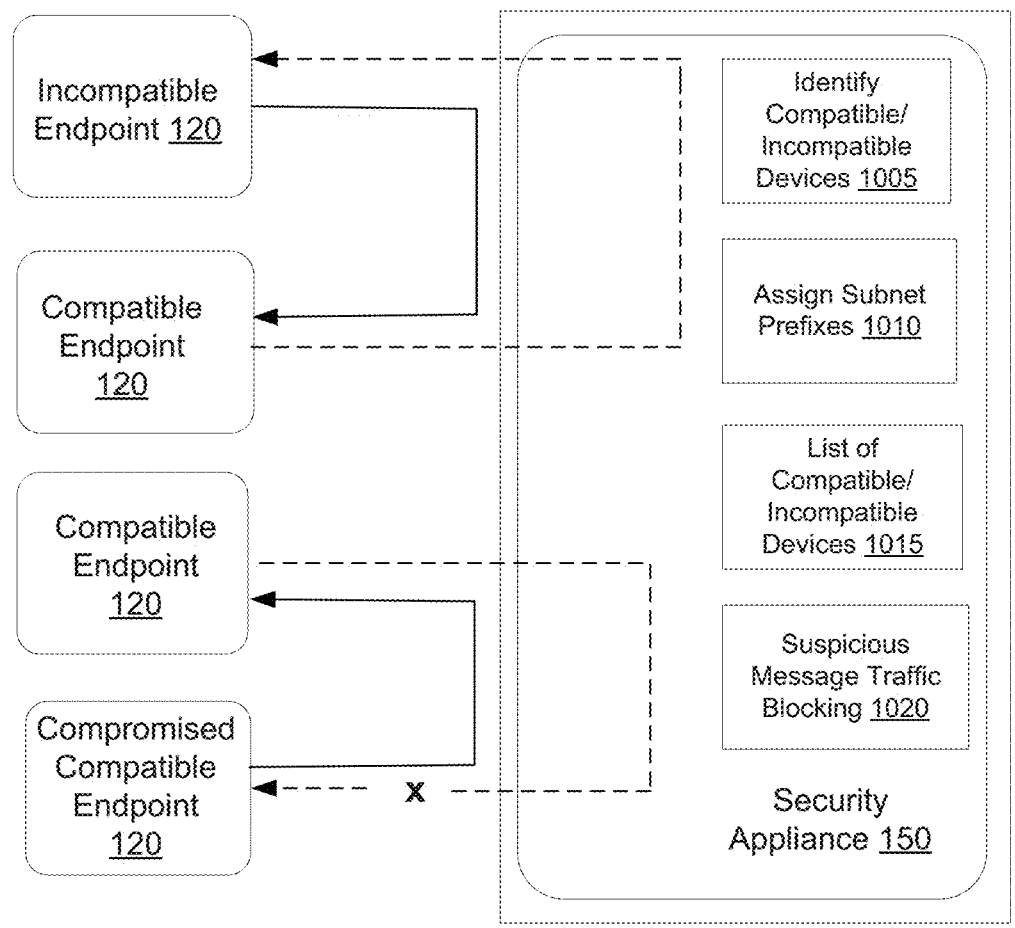
FIG. 10 illustrates intra-VLAN communication in accordance with an implementation.

FIG. 10 illustrates the example in which there are compatible endpoint devices, incompatible endpoint devices, and possibly compromised compatible endpoint devices. The communication between compatible endpoint devices is protected as discussed earlier above. For the case of communication between a compatible endpoint device and incompatible endpoints, the compatible endpoint device has the security appliance 150 set as the default gateway, and the security appliance can monitor for suspicious message traffic and block suspicious message traffic. As illustrated in FIG. 10, a software module may be included or bundled with the security appliance 150 such as software module to identify compatible/incompatible devices 1005, a software module to assign subnet prefixes 1010, a software module to generate a list or map of compatible/incompatible devices 1015, and a software module to block suspicious message traffic 1020.

Detailed DHCP Example

Figure 11:
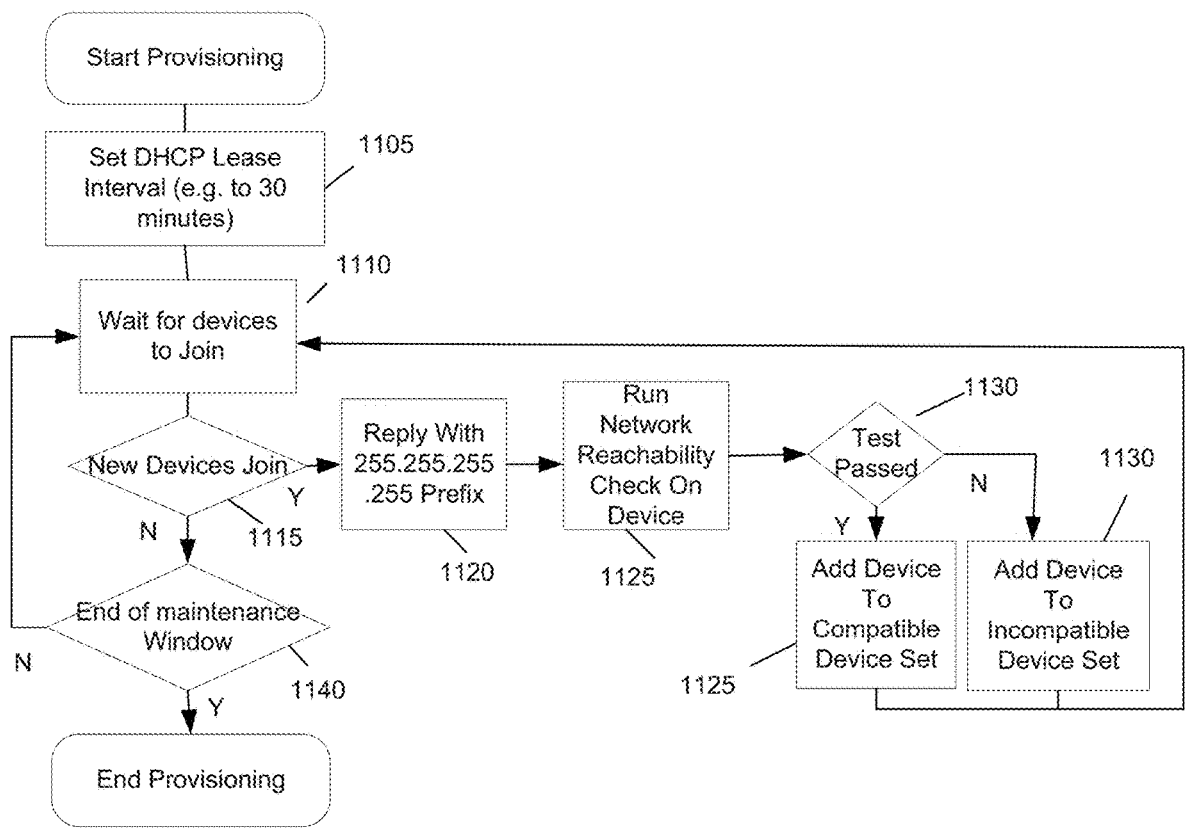
FIG. 11 is a flow chart of a method of provisioning in accordance with an implementation.
Figure 12:
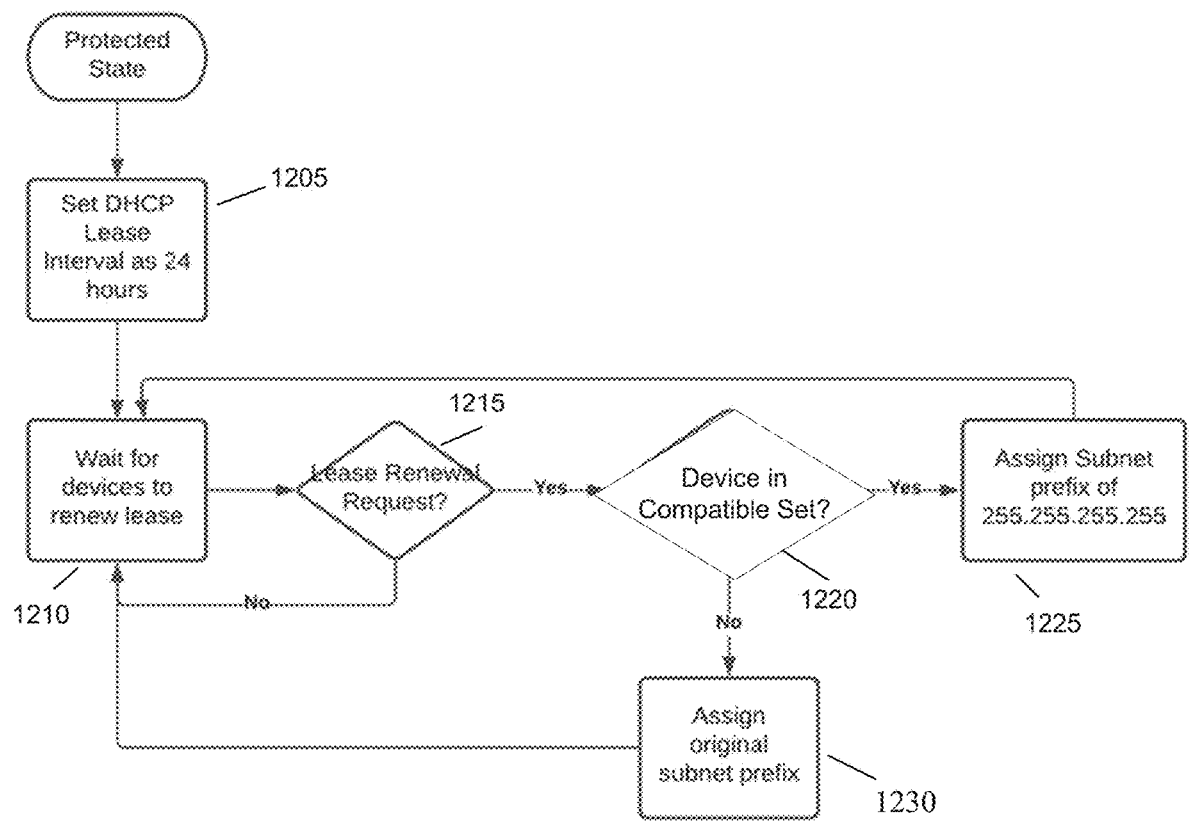
FIG. 12 is a flow chart of a method of protecting endpoint devices in a protected state in accordance with an implementation.
Figure 13:
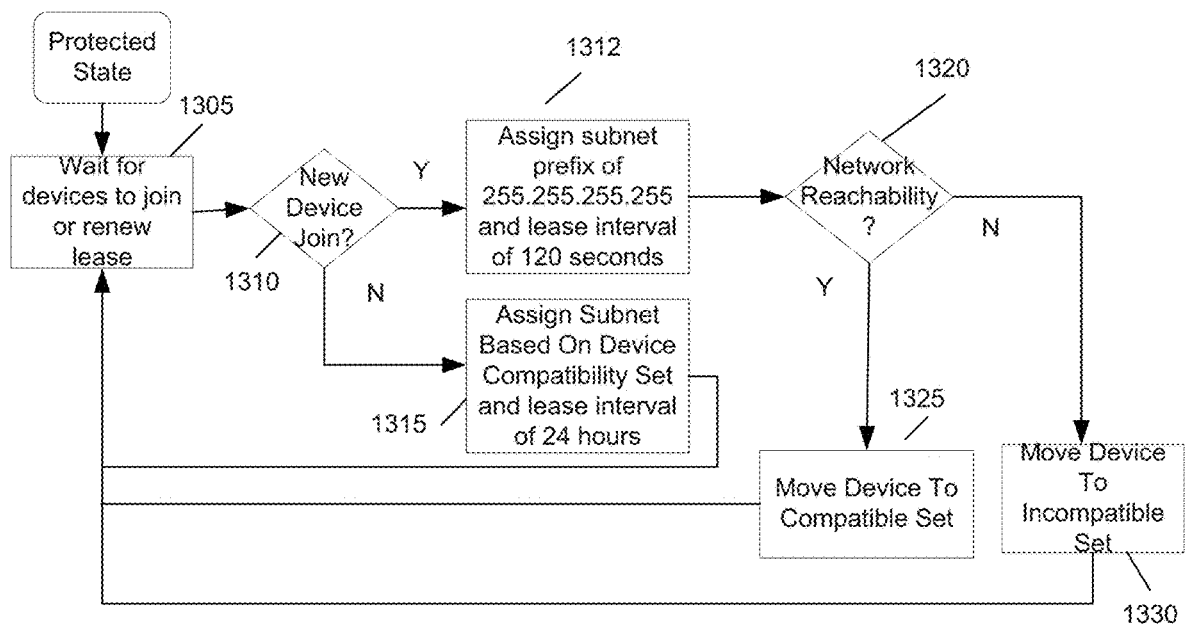
FIG. 13 is a flow chart of new device insertion in accordance with an implementation.

A detailed implementation example will now be discussed in regards to FIGS. 11, 12, and 13. FIG. 11 describes a provisioning step. FIG. 12 describes a protected state. FIG. 13 describes the example of adding a new endpoint device.

Preparation Step

Before an existing network is migrated to use the security appliance, a preparatory step may be performed to ease the migration process. The user modifies the DHCP lease interval on their existing network to a small interval such as 30 minutes or 1 hour. This operation would typically be performed 24-48 hours before on-boarding the security appliance. This causes existing devices on their network to renew their leases at a higher rate than normal and lets the security appliance rapidly test the compatibility of these devices with the all-ones subnet prefix.

Provisioning State

The provisioning step is performed during a maintenance window selected by the user. As an example, the maintenance window may last for a period of 4 hours and may be shorter or longer (as desired by the user). The user shutsdown their existing DHCP server and activates the security appliance. At this point, the security appliance becomes the DHCP server on their network. During this step, the security appliance would attempt to identify and test compatibility of the existing devices with the all-ones subnet prefix.

In one implementation, the provision step utilizes the following basic algorithm to identify and classify devices as either 1) compatible with a subnet prefix of 255.255.255.255) or 2) incompatible with a subnet prefix of all-ones.

First, when new devices join during the maintenance window, the DHCP server associated with the security application first replies with a prefix of all-ones (255.255.255.255).

Second, the security appliance then runs a network reachability check on each device which joined. This network reachability check may comprise of a set of tests such as ping the device (ICMP request/response).

Third, if a device passes the reachability check, it is classified as a compatible device and added to the "compatible" set. If it fails the reachability check, it is classified as an incompatible device and added to the "incompatible" set.

Fourth, the process is repeated for each device during the maintenance/provisioning window.

At the end of the maintenance/provisioning window, the security appliance builds a set of compatible and incompatible devices.

FIG. 11 following flow chart identifies the operations performed by the Security Appliance during the provisioning step. In the provision state, the DHCP lease interval is reset in block 1105 to a reduced time interval (e.g., 30 minutes) that is much less than a typical normal DHCP lease interval (e.g., 24 hours). After the lease interview is reduced, the security applicant software waits for endpoint devices to join in block 1110. When a new device is detected in block 1115, the security appliance software replies to a newly joined device with a reply message with the 255.255.255.255 subnet prefix. In block 1125, a network reachability test is performed on the newly joined device. This might include, for example, monitoring for a response of the newly joined device in response to the reply and/or performing additional tests known in the art for determining reachability of endpoint devices. If the newly joined device passes the reachability test in block 130, it is added to a set of endpoint devices that are compatible with the 255.255.255.255 subnet prefix. If not, then in block 1140 it is added to a set of incompatible devices. The process loops around throughout the maintenance window, during which all of the endpoint devices in a VLAN group are classified regarding whether they are compatible with the 255.255.255.255 subnet prefix. This may include, for example, generating a list of compatible and incompatible devices for use by the security appliance.

Protected State

After the maintenance window is completed, the security appliance transitions into the protected state. It uses the following core algorithm to classify and assign IP addresses for each endpoint:

1. Change the DHCP lease interval to a normal DHCP lease window. For example, 24 hour period is a common normal operating DHCP lease interval.

2. For devices in the "incompatible" set, when they renew their lease, the method assigns the original subnet mask for that network. This means that such devices would not be protected against lateral propagation attacks from ransomware. However, this is deemed as acceptable as these typically would be a small fraction of devices on the shared network. Further, any communication from incompatible devices to compatible devices would still result in the return traffic flowing via the security appliance. This would leave the compatible devices protected from lateral propagation attacks.

3. For devices in the "compatible" set, when they renew their lease, the method assigns a subnet mask consisting of all-ones (255.255.255.255). These devices are protected against lateral propagation attacks as all traffic to/from these devices would pass through the security appliance.

FIG. 12 is a flow chart identifying the operations performed by the security appliance during the protected state. In block 1205, the DHCP lease interval is set to its normal interval (e.g., 24 hours). In block 1210, the security appliance waits for endpoint devices to renew their lease. In block 1215, a decision is made if a lease renewal is requested. If not, the process continues to wait. If yes, the process makes a determination if the associated device requesting a lease renewal is a compatible endpoint device. If yes, the endpoint device is assigned a subnet prefix of 255.255.255.255. If no, the endpoint device is assigned it's original or default subnet prefix. That is, it is assigned a different subnet prefix that will work for that device, which would typically be the original subnet prefix the endpoint device had before the security was deployed. This original subnet prefix may, for example, be recorded as part of the deployment process, although it could also be determined or be based or be chosen to be one of the more universal subnet prefixes. As can be seen in FIG. 12, the process loops around until all of the endpoint devices in a VLAN group are assigned a subnet mask.

New Device Insertion

When the security appliance is in the protected state, if a new device is inserted into the shared network, the following algorithm is used to determine its compatibility with the all-ones network prefix.

1. First the device is assigned a subnet mask of all-ones (255.255.255.255) and a very short lease interval (e.g., 120 seconds).

2. During this period, a device reachability check is performed, and the device is moved into the "compatible" set or the "incompatible" set based on the test results.

3. When the newly added device renews its lease after the shortened lease period (e.g., a period of 120 seconds or during the half-lease renewal interval of 60 seconds), it would be assigned a subnet mask of 255.255.255.255 or the original network subnet mask based on the combability checks.

FIG. 13 is a flowchart which shows the operation of the system when a new device is added. In block 1305, the process waits for devices to join or renew a DHCP lease. If the device is not a new device, the security appliance in block 1315 assigns a subnet prefix based on the earlier classification whether the endpoint device is compatible or incompatible with a subnet mask of 255.255.255.255. Block 1315 also sets the lease period to be the normal lease period (e.g., 24 hours).

However, for a new device, the process in block 1312 assigns a subnet prefix of 255.255.255.255 and a shortened lease period (e.g., 120 seconds). A network reachability decision is made in block 1320 for the device. In block 1325, a determination is made if the new device belongs in the compatible set of devices. In block 1330, a decision is made whether the new device is incompatible with a subnet mask of 255.255.255.255.

As the process is implemented as loop, new devices are automatically detected, classified, and assigned an appropriate subnet prefix.

Ransomware Protection

It will be understood that compatible endpoint devices are protected in the manner discussed earlier in this disclosure even if some of the endpoint devices are incompatible with a subnet mask of 255.255.255.255. For example, the security appliance may detect a message attribute of a message originating from an endpoint device indicative of ransomware, such as file scanning code or file encryption code. The security appliance may also detect an attribute of message traffic, relative to a baseline profile of message traffic, indicative of an attempt to laterally propagate ransomware. This may include detecting a response message from a first endpoint device to a second endpoint device not having a corresponding request message from the second endpoint device pass through the security appliance. Alerts may be generated in response to detecting Ransomware, as well as blocking traffic to compromised compatible or incompatible endpoint devices.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
    performing a compatibility test to classify a plurality of endpoint devices in a shared VLAN environment based on their compatibility with a subnet mask of 255.255.255.255;
    deploying the security appliance in an access port or a trunk port of the shared VLAN environment;
    assigning a subnet mask of 255.255.255.255 for the endpoint devices of the shared VLAN environment compatible with a subnet mask of 255.255.255.255 to set the security appliance as their default gateway;
    assigning an original subnet mask, different than 255.255.255.255, for endpoint devices of the shared VLAN environment incompatible with a subnet mask of 255.255.255.255;
    monitoring, by the security appliance, intra-VLAN communication between the plurality of endpoint devices of the shared VLAN environment; and
    detecting, by the security appliance, lateral propagation of ransomware between endpoint devices via intra-VLAN communication in the shared VLAN environment.

2. The computer-implemented method of claim 1, wherein in a provisioning state, a compatibility test automatically classifies endpoint devices by their compatibility with an all-ones subnet prefix by modifying a Dynamic Host Configuration Protocol (DHCP) server for the DHCP server to perform at least one test to determine reachability of individual endpoint devices using a subnet mask of 255.255.255.255.

3. The computer-implemented method of claim 2, wherein the compatibility test includes setting a DHCP lease interval to an interval less than that of normal operation, monitoring endpoint devices joining, and for each endpoint device that joins, replying with a 255.255.255.255 subnet prefix and running a network reachability test to determine whether individual endpoint devices are either compatible or incompatible with a 255.255.255.255 subnet prefix.

4. The computer-implemented method of claim 1, wherein in a protected state, endpoint devices classified as being compatible with a 255.255.255.255 subnet prefix have their subnet prefix assigned with the 255.255.255.255 subnet prefix in response to DHCP a Dynamic Host Configuration Protocol (DHCP) lease renewal.

5. The computer-implemented method of claim 1, wherein in a protected state, in response to the addition of a new endpoint device, a 255.255.255.255 subnet prefix is assigned for the new endpoint device and a network reachability test is performed to determine whether the new endpoint device is compatible with a 255.255.255.255 subnet prefix.

6. The method of claim 5, wherein a new endpoint device classified as being compatible with a 255.255.255.255 subnet prefix is assigned the 255.255.255.255 subnet prefix.

7. The computer-implemented method of claim 1, further comprising: allowing, by the security appliance, only authorized communication with endpoint devices of the shared VLAN environment.

8. The computer-implemented method of claim 1, wherein the security appliance blocks unauthorized communication between the plurality of endpoint devices of the shared VLAN environment assigned the 255.255.255.255 subnet prefix.

9. The computer-implemented method of claim 1, further comprising: quarantining an endpoint device compromised by ransomware.

10. The computer-implemented method of claim 9, wherein the quarantining comprises blocking intra-VLAN communication of the compromised endpoint device.

11. The computer-implemented method of claim 1, wherein the detection comprises detecting a message attribute of a message originating from an endpoint device indicative of ransomware.

12. The computer-implemented method of claim 11, wherein the message attribute comprises file scanning code or file encryption code.

13. The computer-implemented method of claim 11, wherein the detection comprises detecting an attribute of message traffic, relative to a baseline profile of message traffic, indicative of an attempt to laterally propagate ransomware.

14. The computer-implemented method of claim 1, wherein the detection comprises: detecting a response message from a first endpoint device to a second endpoint device not having a corresponding request message from the second endpoint device pass through the security appliance.

15. The computer-implemented method of claim 1, further comprising generating an alert in response to detecting an attempt of a compromised endpoint device to laterally propagate ransomware via intra-VLAN communication.

16. A computer-implemented method of ransomware protection in a Virtual Local Area Network (VLAN), comprising:
providing a security appliance in an access port or a trunk port of a shared VLAN environment having a plurality of endpoint devices including a plurality of endpoint devices compatible with a subnet mask of 255.255.255.255 and at least one endpoint device incompatible with a subnet mask of 255.255.255.255;
assigning a subnet mask of 255.255.255.255 for the plurality of endpoint devices of the shared VLAN environment that are compatible with a subnet mask of 255.255.255.255 to set the security appliance as their default gateway;
assigning a subnet mask different than 255.255.255.255 for the at least one endpoint device of the shared VLAN environment that is incompatible with a subnet mask of 255.255.255.255;
monitoring, by the security appliance, intra-VLAN communication between the plurality of endpoint devices of the shared VLAN environment;
detecting, by the security appliance, attributes of intra-LAN messages indicative of attempted lateral propagation of ransomware from endpoint devices assigned the 255.255.255.255 subnet mask via intra-VLAN communication in the shared VLAN environment, including identifying attempts by individual endpoint devices to circumvent the security appliance by identifying response messages passing through the security appliance not having corresponding request messages;
detecting, by the security appliance, attributes of intra-LAN messages indicative of attempted lateral propagation of ransomware, from endpoint devices assigned the subnet mask different than the 255.255.255.255 subnet mask to endpoint devices assigned the subnet mask of 255.255.255.255;
allowing, by the security appliance, only authorized communication with the plurality of endpoint devices of the shared VLAN environment compatible with the 255.255.255.255 subnet mask; and
quarantining an endpoint device compromised by ransomware by blocking intra-VLAN communication of the compromised endpoint device routed through the security appliance.

17. The computer-implemented method of claim 16, wherein the detecting comprises detecting message attributes associated with file scanning code or file encryption code.

18. The computer-implemented method of claim 16, wherein the detecting comprises detecting an attribute of message traffic, relative to a baseline profile of message traffic, indicative of an attempt to laterally propagate ransomware.

19. The computer-implemented method of claim 16, wherein the detecting comprises: detecting a response message from a first endpoint device to a second endpoint device not having a corresponding request message from the second endpoint device pass through the security appliance.

20. A computer-implemented method of operating a security appliance for ransomware protection in a Virtual Local Area Network (VLAN), comprising:
in a provisioning state, classifying individual endpoint devices of a plurality of endpoint devices as being either compatible with a subnet mask of 255.255.255.255 or incompatible with a subnet mask of 255.255.255.255;
in a protected state, assigning a subnet mask of 255.255.255.255 to set the security appliance as a default gateway for endpoint devices compatible with a subnet mask of 255.255.255.255;
in the protected state, assigning a subnet mask different than 255.255.255.255 for endpoint devices of a shared VLAN environment that are incompatible with a subnet mask of 255.255.255.255;
detecting, by the security appliance, attributes of intra-LAN messages indicative of attempted lateral propagation of ransomware from endpoint devices assigned the 255.255.255.255 subnet mask via intra-VLAN communication in the shared VLAN environment, including identifying attempts by individual endpoint devices to circumvent the security appliance by identifying response messages passing through the security appliance not having corresponding request messages; and
quarantining an endpoint device compromised by ransomware by blocking intra-VLAN communication of the compromised endpoint device routed through the security appliance.

21. The computer-implemented method of claim 20, further comprising automatically detecting compatibility of new endpoint devices with the 255.255.255.255 subnet prefix and 1) assigning new compatible endpoint devices with the 255.255.255.255 subnet prefix and 2) assigning new incompatible endpoint devices with the a subnet prefix different than the 255.255.255.255 subnet prefix and which is compatible with new endpoint device.

* * * * *

UNITED STATES PATENT AND TRADEMARK OFFICE
CERTIFICATE OF CORRECTION

PATENT NO. : 11,323,474 B1
APPLICATION NO. : 17/387615
DATED : May 3, 2022
INVENTOR(S) : Ritesh R. Agrawal et al.

It is certified that error appears in the above-identified patent and that said Letters Patent is hereby corrected as shown below:

On the Title Page

Column 1, In the Related U.S. Application Data Insert:
--Continuation-in-part of application No. 17/357,757, filed on June 24, 2021, now Patent No. 11,171,985.--

Signed and Sealed this
Twenty-second Day of November, 2022

Katherine Kelly Vidal
*Director of the United States Patent and Trademark Office*